Jan. 12, 1937.                S. SEVERSON                2,067,422
                             STRAW SEPARATOR
                          Filed Sept. 30, 1935
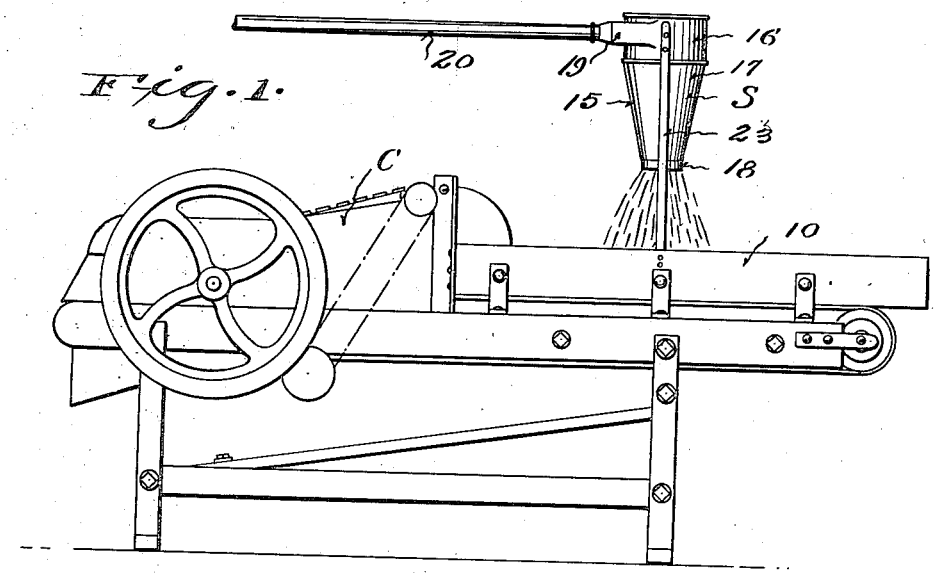
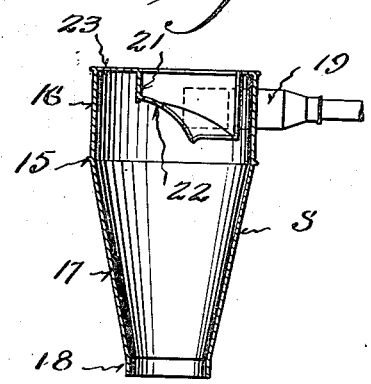
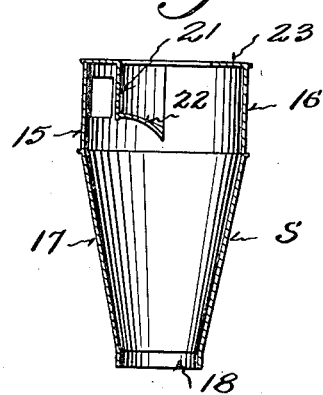
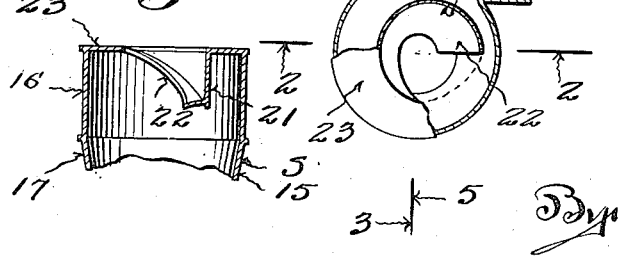
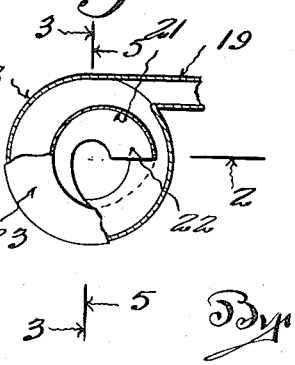

Patented Jan. 12, 1937

2,067,422

UNITED STATES PATENT OFFICE 2,067,422

STRAW SEPARATOR

Samuel Severson, Valders, Wis., assignor of one-fourth to Albert C. Severson, Valders, Wis., and one-half to John Stahl, Chilton, Wis.

Application September 30, 1935, Serial No. 42,846

1 Claim. (Cl. 183—88)

This invention appertains to means for facilitating the handling and cutting of straw for cattle feed, bedding, and so forth.

It is the common custom among dairy farmers, after they have threshed their grain, to run their straw through a feed cutter and blow the same into some convenient place in their barn to be stored for use as feed or bedding for cattle.

Blowing the straw directly from the threshing machine straw-blower into the feed cutter is not practical, because the blast of air that comes with the straw from the threshing machine straw-blower is so strong that it will blow the straw out of the feed cutter, and only a small percentage of the straw will go through the feed cutter.

Therefore, straw cutting has heretofore been done by an extra handling of the straw after the threshing has been completed and the straw deposited in a stack or mow. It has required the labor of several men to bring the straw from the stack or mow to the feed cutter. Obviously, this is an unnecesary waste of time and labor.

One of the primary objects of my invention is the provision of novel means whereby both the threshing and feed-cutting can be done at the same time and with a single handling, with the consequent saving of both time and labor.

Another salient object of my invention is the provision of novel means for receiving the straw and air current from the threshing machine straw-blower, so that the air will be separated from the straw, and so that the straw will be deposited gently upon the feed table of the feed cutter.

A further object of my invention is the provision of a separator arranged directly above the feed table of a feed cutter, having connection with the straw blower of a threshing machine, so that the straw and the air current will be received within the separator, the separator being of such construction that the air, through a centrifugal action, will be separated from the straw and forced out of the top of the separator. The straw will then gravitate to the bottom of the separator and be deposited upon the feed table of the feed cutter.

A still further object of my invention is to provide an improved means for delivering straw from a threshing machine to a feed cutter of the above character, which will be durable and efficient in use, one that will be simple and easy to manufacture, and one which can be placed upon the market and connected with a threshing machine and feed cutter at a small cost. With these and other objects in view, the invention consists in the novel construction, arrangement, and formation of parts, as will be hereinafter more specifically described, claimed, and illustrated in the accompanying drawing, in which drawing:—

Figure 1 is a side elevation of a feed cutter showing my improved appliance incorporated therewith.

Figure 2 is an enlarged vertical section through the separator, taken substantially on the line 2—2 of Figure 4, looking in the direction of the arrows.

Figure 3 is a similar view taken at right angles to Figure 2, and on the line 3—3 of Figure 4, looking in the direction of the arrows.

Figure 4 is a top plan view of the improved separator, with the top wall thereof broken away, and parts of the separator shown in section.

Figure 5 is a fragmentary vertical sectional view taken on the line 5—5 of Figure 4, looking in the direction of the arrows.

Referring to the drawing in detail, wherein similar reference characters designate corresponding parts throughout the several views, the letter "S" generally indicates my improved separator, and "C" a feed cutter with which the same can be associated. The feed cutter "C" can be considered of ordinary character, and hence the same will not be described in detail, but it is to be noted that the same is provided with a feed-table 10 for initially receiving the straw, and for moving the same to the cutting knives.

The separator "S" is preferably formed from sheet metal of the desired gauge, but obviously the same can be fabricated in any preferred manner, and out of any desired material.

As shown, the same includes a hollow body 15 having the upper cylindrical portion 16, and the depending frusto-conical portion 17. The depending frusto-conical portion 17 has its lower end provided with an outlet spout 18. Extending tangentially from the cylinder portion 16 is the inlet nozzle 19, which has communicating therewith the delivery pipe 20, which leads from the blower pipe of the threshing machine straw blower (not shown).

Arranged within the cylindrical portion 16 of the body is the vertically disposed, eccentrically positioned inner wall 21. This wall 21 extends partially about the cylindrical portion 16, and has formed thereon, or secured thereto, the inwardly directed spiral flange 22. The flange 22 gradually decreases in width toward its upper end, and it is to be noted that the narrow upper end of the flange is disposed furthermost away from the inlet 19, and substantially diametrically opposite said inlet.

The separator "S" is arranged directly above the feed-table 10 of the feed cutter "C", and is secured to the feed-table in any preferred manner, such as by straps 23. The lower discharge end 18 of the separator is preferably positioned about a foot above the feed table 10.

By referring to Figures 2 to 5, inclusive, it will be seen that the eccentrically disposed inner wall 21 is connected to the cylindrical portions 16 of the body by means of a top wall 23. This top wall 23 terminates at the inner wall 21.

In use of my improved device, the straw conveyed by the blast of air from the straw blower of the threshing machine enters into the body 15 from the inlet 19, and the conveyor pipe 20. The air and the straw travel around the body in a circular path, and between the outer cylindrical portion 16, and the inner wall 21. The air gradually loses its velocity, and as the air and straw rides past the top narrowest portion of the flange 22, the air and straw strike against the broad lowermost portion of the flange 22. The air, having a tendency to rise, follows the curvature of the flange 22, while the heavier straw drops down the inclined sides of the lowermost portion of the body 17, and gently drops on the feed table 10. The blast of air which comes with the straw is separated from the straw by centrifugal action, and is forced out through the top of the body, as stated, while the straw is allowed to work its way downwardly and fall gently through the large hole in the bottom of the body.

By the use of my improved separator the straw is quickly and efficiently fed to the feed cutter without any loss of straw whatsoever.

Changes in details may be made without departing from the spirit or the scope of my invention, but what I claim as new is:

An air and straw separator for a feed cutter comprising a hollow drum including a cylindrical top portion and a depending funnel portion, an inner eccentrically disposed wall arranged within the cylindrical portion gradually decreasing in depth and extending partially about the cylindrical portion, the cylindrical portion having a tangentially disposed blower inlet arranged substantially adjacent to the deepest portion of said inner wall, an inwardly directed spiral flange formed on the lower edge of the inner wall, said spiral flange gradually increasing in width toward its lowermost portion and the deepest portion of said inner wall, the narrowest portion of said flange being substantially diametrically opposite the inlet, and a flat top plate connecting the upper edge of the inner wall with the upper edge of the cylindrical top portion of the drum.

SAMUEL SEVERSON.